US012682649B2

(12) United States Patent
Yamane

(10) Patent No.: US 12,682,649 B2
(45) Date of Patent: Jul. 14, 2026

(54) INFORMATION PROCESSING DEVICE, INFORMATION PROCESSING METHOD, AND RECORDING MEDIUM FOR DETERMINING POTENTIAL COLLISION OF DOOR SELECTED BY USER

(71) Applicant: Panasonic Intellectual Property Management Co., Ltd., Osaka (JP)

(72) Inventor: Ichiro Yamane, Kyoto (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 339 days.

(21) Appl. No.: 18/408,262

(22) Filed: Jan. 9, 2024

(65) Prior Publication Data

US 2024/0257528 A1 Aug. 1, 2024

(30) Foreign Application Priority Data

Jan. 26, 2023 (JP) ................................. 2023-010215

(51) Int. Cl.
*G06V 20/56* (2022.01)
*B60R 1/23* (2022.01)
(Continued)

(52) U.S. Cl.
CPC ................ *G06V 20/56* (2022.01); *B60R 1/23* (2022.01); *G06V 10/80* (2022.01); *G06V 20/64* (2022.01)

(58) Field of Classification Search
CPC ........ G06V 20/56; G06V 10/80; G06V 20/64; B60R 1/23
See application file for complete search history.

(56) References Cited

U.S. PATENT DOCUMENTS

2019/0344828 A1* 11/2019 Omori ................... B60W 50/14

FOREIGN PATENT DOCUMENTS

JP 2012051391 A * 3/2012
JP 2012-165138 8/2012
(Continued)

OTHER PUBLICATIONS

Notice of Reasons for Refusal for Japanese App. No. 2023-010215, dated Mar. 11, 2025, with English translation.
(Continued)

*Primary Examiner* — Emily C Terrell
*Assistant Examiner* — Daniella M. DiGuglielmo
(74) *Attorney, Agent, or Firm* — Greenblum & Bernstein, P.L.C.

(57) ABSTRACT

The information processing device is an information processing device for generating driving assistance information for a vehicle. An information processing device includes: a detection data obtainer that obtains detection data, the detection data being three-dimensional data obtained by detecting an object located outside the vehicle; a data complementation that extracts object data from a plurality of pieces of three-dimensional data of objects stored in advance, the object data being three-dimensional data of the object corresponding to the detection data, and complements the detection data with the object data to generate complementary data that is three-dimensional data; and a data synthesizer that synthesizes the complementary data and vehicle data, the vehicle data being three-dimensional data of the vehicle, to generate synthesized data that is three-dimensional data including the vehicle and an external area of the vehicle.

11 Claims, 16 Drawing Sheets

(51) Int. Cl.
     _G06V 10/80_          (2022.01)
     _G06V 20/64_          (2022.01)

(56)                    References Cited

FOREIGN PATENT DOCUMENTS

| JP | 2013-025528 | | 2/2013 |
| JP | 2013025528 A | * | 2/2013 |
| JP | 2019-196056 | | 11/2019 |

OTHER PUBLICATIONS

Notice of Reasons for Refusal for Japanese App. No. 2023-010215, dated Dec. 17, 2024, with English translation.

* cited by examiner (a)

Image of state with rear door closed (b)

Image of state with rear door open (c)

Image illustrating movable area of rear door

INFORMATION PROCESSING DEVICE, INFORMATION PROCESSING METHOD, AND RECORDING MEDIUM FOR DETERMINING POTENTIAL COLLISION OF DOOR SELECTED BY USER

CROSS REFERENCE TO RELATED APPLICATION

The present application is based on and claims priority of Japanese Patent Application No. 2023-010215 filed on Jan. 26, 2023.

FIELD

The present disclosure relates to an information processing device, an information processing method, and a recording medium for generating vehicle driving assistance information.

BACKGROUND

A device for providing vehicle driving assistance information to improve vehicle safety and prevent accidents is known. Patent Literature (PTL) 1 discloses a driving assistance information-providing device for providing information until the minimum space required to open and close a flip-up tailgate of a vehicle can no longer be ensured, regardless of the shape of an obstacle present behind the vehicle.

CITATION LIST

Patent Literature

PTL 1: Japanese Unexamined Patent Application Publication No. 2012-165138

SUMMARY

However, the driving assistance information-providing device according to PTL 1 can be improved upon.

In view of this, the present disclosure provides an information processing device and the like capable of improving upon the above related art.

An information processing device according to one aspect of the present disclosure is an information processing device for generating driving assistance information for a vehicle, the information processing device including: a detection data obtainer that obtains detection data, the detection data being three-dimensional data obtained by detecting an object located outside the vehicle; a data complementation that extracts object data from a plurality of pieces of three-dimensional data of objects stored in advance, the object data being three-dimensional data of the object corresponding to the detection data, and complements the detection data with the object data to generate complementary data that is three-dimensional data; and a data synthesizer that synthesizes the complementary data and vehicle data, the vehicle data being three-dimensional data of the vehicle, to generate synthesized data that is three-dimensional data including the vehicle and an external area of the vehicle.

An information processing device according to one aspect of the present disclosure is an information processing device for generating driving assistance information for a vehicle, the information processing device including: a detection data obtainer that obtains detection data, the detection data being three-dimensional data obtained by detecting an object located outside the vehicle; and a synthesizer that extracts object data from a plurality of pieces of three-dimensional data of objects stored in advance, the object data being three-dimensional data of the object corresponding to the detection data, and synthesizes the detection data, the object data, and three-dimensional data of the vehicle to generate synthesized data that is three-dimensional data.

An information processing method according to one aspect of the present disclosure is an information processing method for generating driving assistance information for a vehicle, the information processing method including: obtaining detection data, the detection data being three-dimensional data obtained by detecting an object located outside the vehicle; extracting object data from a plurality of pieces of three-dimensional data of objects stored in advance, the object data being three-dimensional data of the object corresponding to the detection data, and complements the detection data with the object data to generate complementary data that is three-dimensional data; and synthesizing the complementary data and vehicle data, the vehicle data being three-dimensional data of the vehicle, to generate synthesized data that is three-dimensional data including the vehicle and an external area of the vehicle.

A recording medium according to one aspect of the present disclosure is a non-transitory computer-readable recording medium having recorded thereon a computer program for causing a computer to execute the information processing method.

Effects of the Invention

The information processing device and the like according to one aspect of the present disclosure can be improved upon.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS (Circumstances Leading to the Present Disclosure)

Circumstances leading to the present disclosure will be described with reference to FIGS. 1 and 2.

Figure 1:
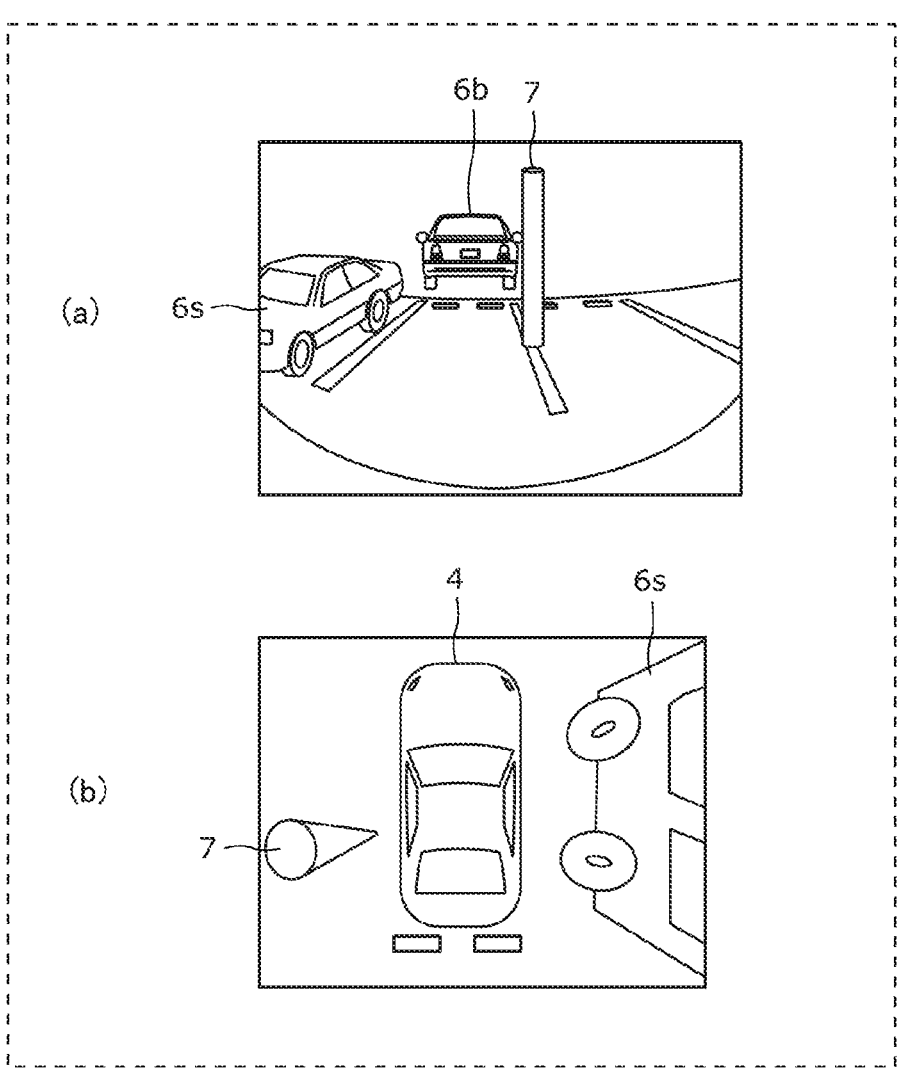
FIG. 1 illustrates an example of images provided by an information providing system of a comparative example.

FIG. 1 illustrates an example of images provided by an information providing system of a comparative example. The figure illustrates images displayed on a monitor in a cabin of a host vehicle when the vehicle is parked facing rearward.

(a) in FIG. 1 illustrates an image as viewed when looking rearward from the host vehicle. This image shows other vehicles 6b, 6s, pole 7, and the like located behind the host vehicle. However, when a driver is not accustomed to seeing this image, he or she may not be able to grasp the actual distances from the host vehicle to other vehicles 6b, 6s, pole 7.

(b) in FIG. 1 illustrates a bird's-eye view image when vehicle 4, which is the host vehicle, is viewed from above. This image shows another vehicle 6s, pole 7, and the like located at the sides. However, as the image extends outward, another vehicle 6s and pole 7 appear to spread out obliquely, which may cause the driver to feel uncomfortable. Thus, the comparative example has a problem in which the information of objects located around vehicle 4 cannot be appropriately generated, leading to the inability to provide sufficient driving assistance information.

Figure 2:
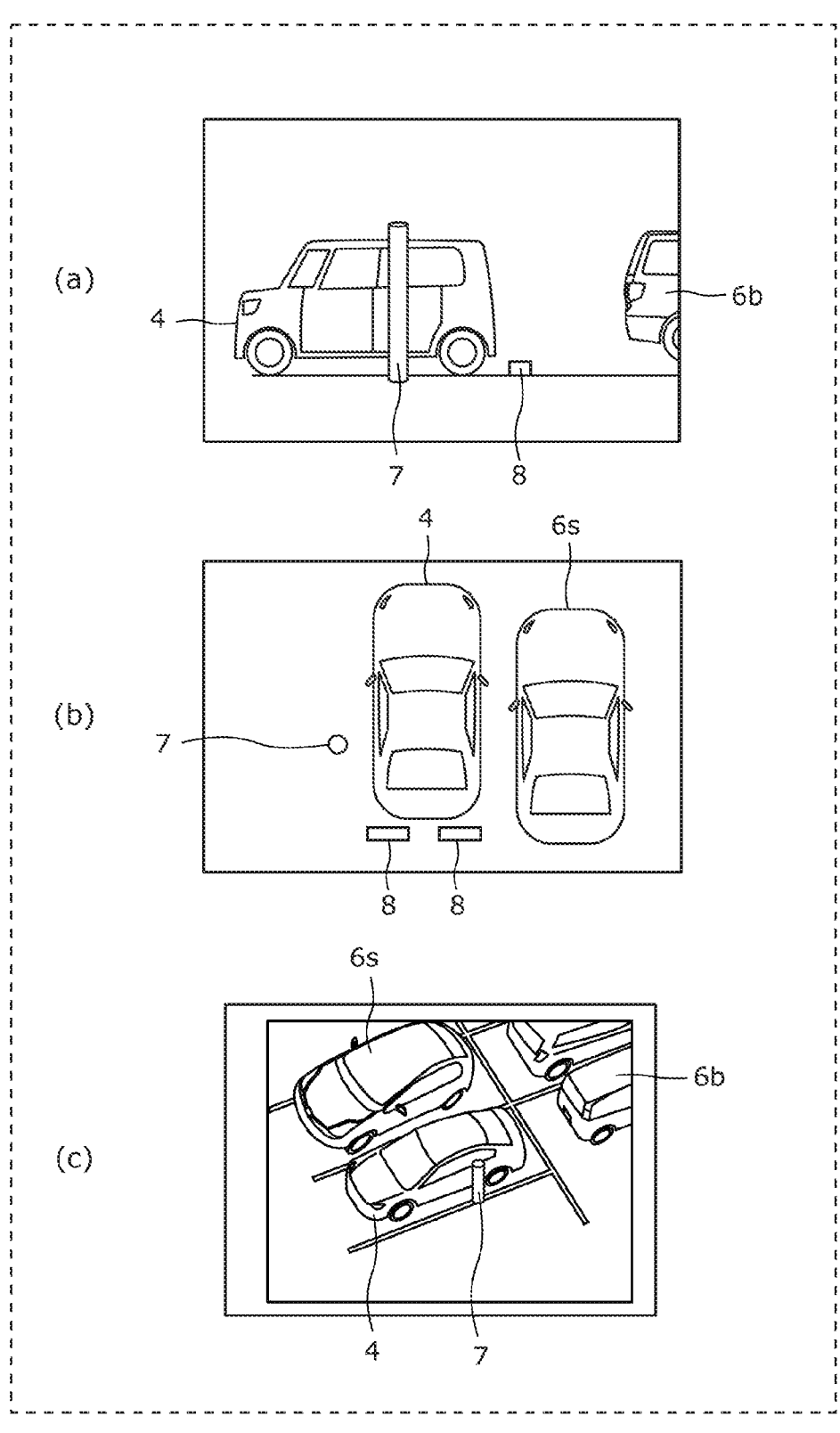
FIG. 2 illustrates an example of images provided by an information providing system of the present disclosure.

FIG. 2 illustrates an example of images provided by an information providing system of the present disclosure.

(a) in FIG. 2 illustrates a view of vehicle 4 viewed from the side, (b) in FIG. 2 illustrates a view of vehicle 4 viewed from above, and (c) in FIG. 2 illustrates a view of vehicle 4 viewed obliquely from above. As illustrated in FIG. 2, vehicle 4 and the objects located around vehicle 4 are provided as image information that can be viewed in an objective manner or a bird's eye view from outside vehicle 4, making it possible to provide a driver with sufficient driving assistance information. The information processing device and the like of the present disclosure have configurations shown below to appropriately generate the driving assistance information as described above.

Embodiments will be specifically described below with reference to the drawings. Each of the embodiments described below is intended to represent generic or specific examples. The numerical values, shapes, materials, components, arrangement positions and connection forms of the components, steps, order of the steps, and the like shown in the following embodiments are examples and are not intended to limit the present disclosure. Among the components in the following embodiments, components that are not described in the independent claims indicating the highest-level concept will be described as optional components. Each of the drawings is a schematic view and is not necessarily a strict illustration. In the drawings, the same components are denoted by the same reference numerals. The present disclosure also includes an embodiment realized by any combination of two or more of a plurality of embodiments.

Embodiment

[Configurations of Information Processing Device and Information Providing System]

Configurations of an information processing device and an information providing system according to an embodiment will be described with reference to FIGS. 3 to 8.

Figure 3:
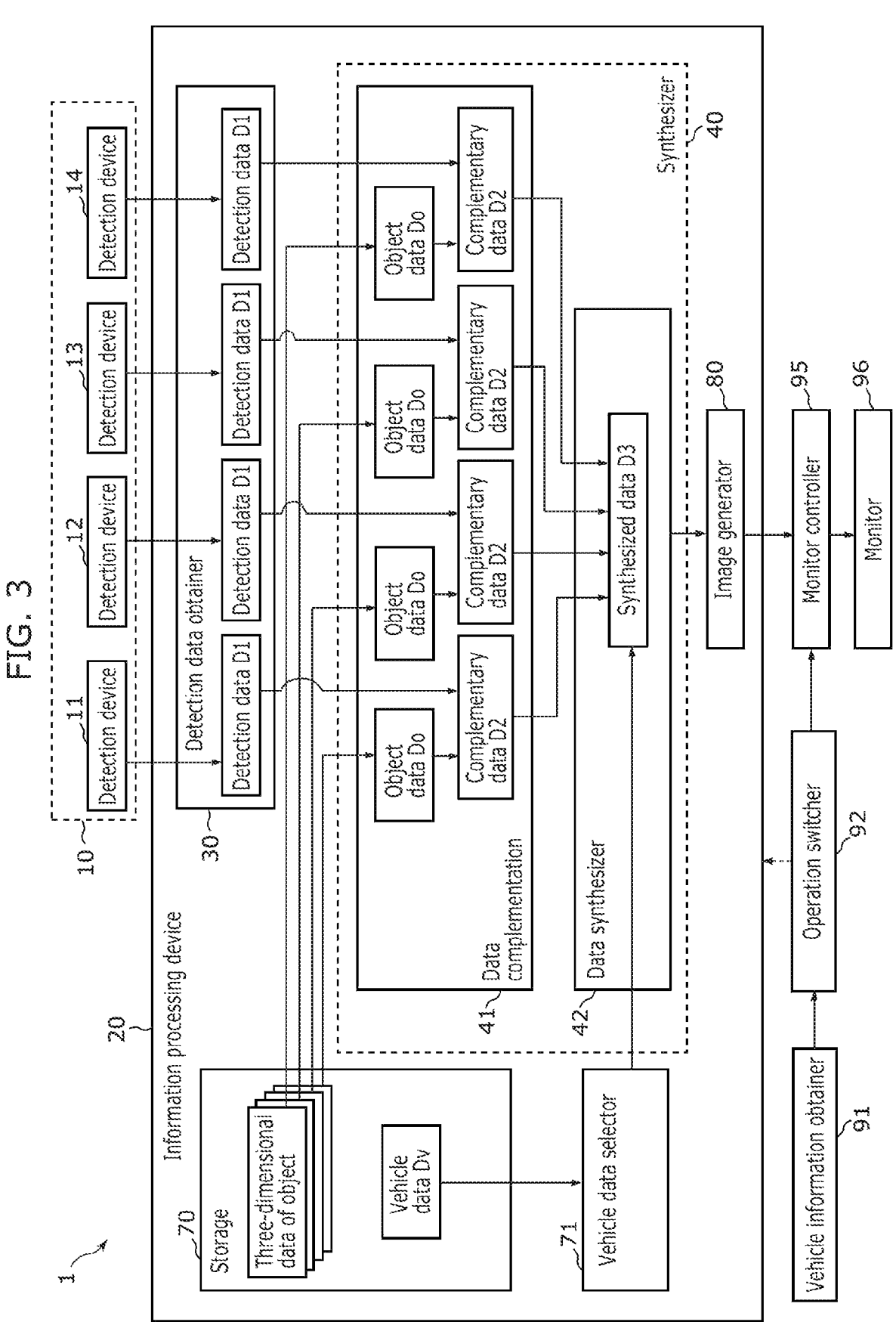
FIG. 3 is a block diagram illustrating an information processing device and an information providing system according to an embodiment.

FIG. 3 is a block diagram illustrating information processing device 20 and information providing system 1 according to the embodiment.

Information processing device 20 is a device for generating the driving assistance information for vehicle 4. For example, when vehicle 4 is parked, information processing device 20 generates the driving assistance information for vehicle 4. Information providing system 1 is a system for providing the driving assistance information generated by information processing device 20, and is mounted inside vehicle 4 (see FIG. 4).

As illustrated in FIG. 3, information providing system 1 includes detection device 10 for detecting an object, and information processing device 20 for generating driving assistance information. Information providing system 1 also includes vehicle information obtainer 91, operation switcher 92, monitor controller 95, and monitor 96.

Detection device 10 is a device for detecting object Oj (see FIGS. 5 and 6) located outside vehicle 4, and is, for example, a stereo camera having a plurality of cameras. Detection device 10 may be a monocular camera using simultaneous localization and mapping (SLAM) technology, or may be a light detection and ranging (LiDAR) system that performs detection and ranging using light.

Figure 4:
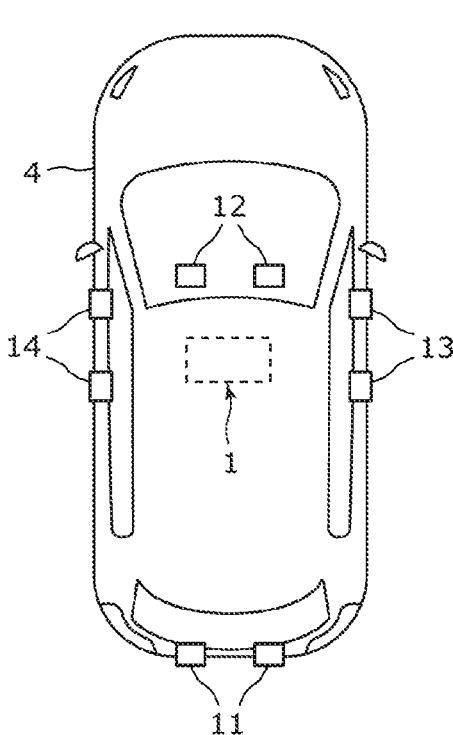
FIG. 4 illustrates installed positions of detection devices included in the information providing system.

FIG. 4 illustrates the installed position of detection device 10 included in information providing system 1.

Detection device 10 is formed of a plurality of detection devices 11, 12, 13, 14, for example. Detection device 11 is provided on the rear body of vehicle 4 to detect object Oj located behind vehicle 4. Detection device 12 is provided on the windshield inside the cabin to detect object Oj located in front of vehicle 4. Detection device 13 is provided on the right body or side mirror of vehicle 4 to detect object Oj on the right side of vehicle 4. Detection device 14 is provided on the left side body or side mirror of vehicle 4 to detect object Oj on the left side of vehicle 4. For example, when detection device 11 is a stereo camera, two cameras are arranged at the same height position in the vertical direction with a predetermined interval in the horizontal direction. The same applies to other detection devices 12 to 14.

Objects Oj detected by detection device 10 are, for example, other vehicles 6b, 6s, pole 7, a wall, a guardrail, and the like located behind and at the sides of vehicle 4. Object Oj may be vehicle stops 8 (see FIG. 2) located behind vehicle 4 or may be a white line indicating the parking area of vehicle 4. Object Oj may be an object having a form different from the surfaces of running, stopping, and parking roads, such as a curb or a gutter.

Detection device 10 detects object Oj to determine the three-dimensional distance between vehicle 4 and object Oj and generate detection data D1 that is three-dimensional data of object Oj. Detection data D1 includes data indicating the distance between vehicle 4 and the three-dimensional point cloud of object Oj. Detection data D1 generated by detection device 10 is output to information processing device 20.

As illustrated in FIG. 3, information processing device 20 includes detection data obtainer 30, synthesizer 40, storage 70, vehicle data selector 71, and image generator 80. Storage 70 stores a computer program for operating information processing device 20. The functions of the components included in information processing device 20 are implemented by executing the computer program stored in storage 70.

Detection data obtainer 30 obtains detection data D1 output from detection device 10. In the following, detection data D1, obtained by detecting each of the rear and right side of vehicle 4 when vehicle 4 is parked facing rearward, will be described. Note that the same applies to the left side and the front.

Figure 5:
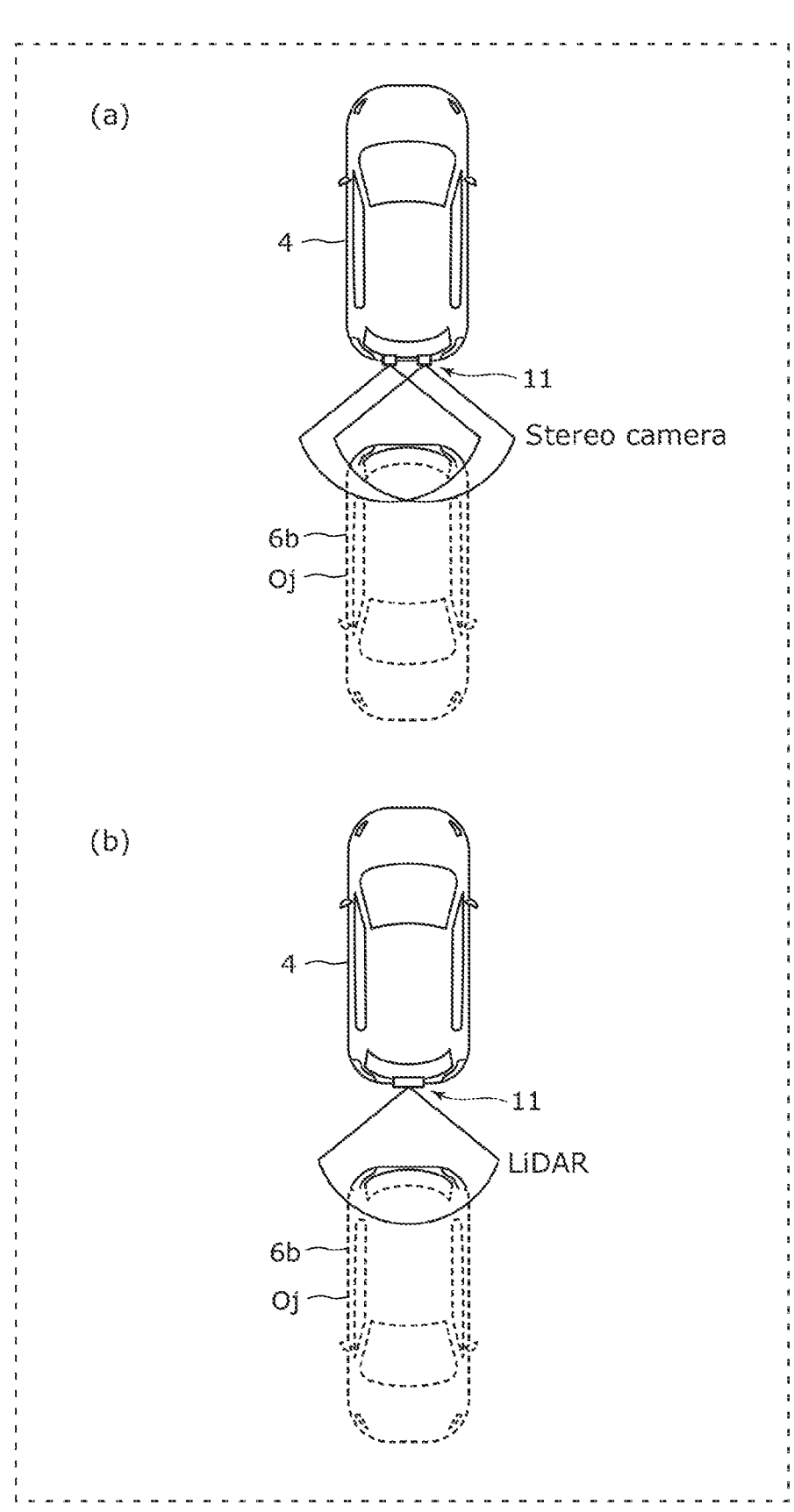
FIG. 5 illustrates an example of detecting an object located behind a vehicle when the vehicle is parked facing rearward.

FIG. 5 illustrates an example of detecting object Oj located behind vehicle 4 when vehicle 4 is parked facing rearward.

(a) in FIG. 5 illustrates an example in which another vehicle 6b located behind is detected by a stereo camera, and (b) in FIG. 5 illustrates an example in which another vehicle 6b located behind is detected by a LiDAR. When vehicle 4 is parked facing rearward, detection data obtainer 30 obtains detection data D1 of object Oj located behind vehicle 4. As illustrated in FIG. 5, the range detectable by detection device 10 is the solid line portion indicated in the figure, and the broken line portion cannot be detected. Therefore, detection data D1 obtained by detection data obtainer 30 is only the three-dimensional data of the rear of another vehicle 6b.

Figure 6:
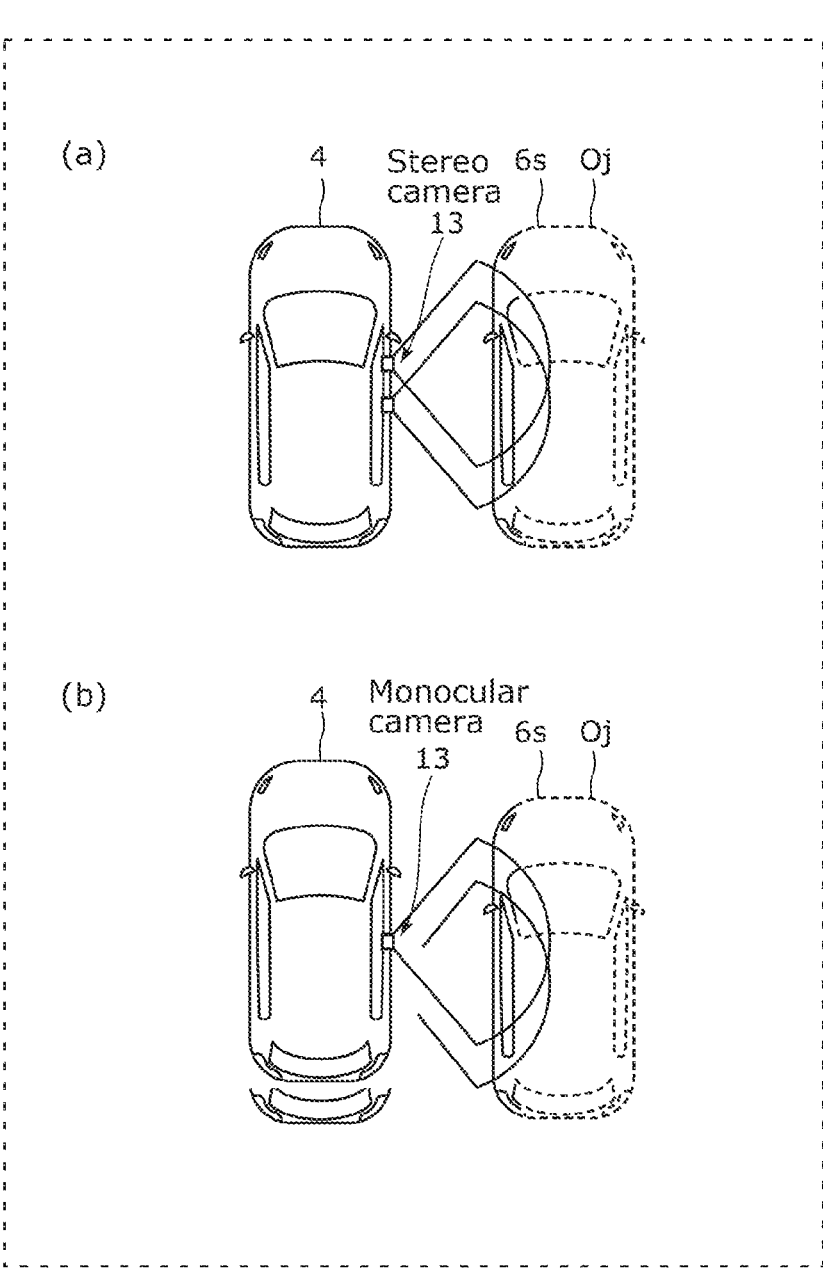
FIG. 6 illustrates an example of detecting an object located at the side of the vehicle when the vehicle is parked facing rearward.

FIG. 6 illustrates an example of detecting object Oj located at the side of vehicle 4 when vehicle 4 is parked facing rearward.

(a) in FIG. 6 illustrates an example in which another vehicle 6s located at the side is detected by a stereo camera, and (b) in FIG. 6 illustrates an example in which another vehicle 6s located at the side is detected by a monocular camera using SLAM technology. When vehicle 4 is parked facing rearward, detection data obtainer 30 obtains detection data D1 of object Oj located at the side of vehicle 4. As illustrated in FIG. 6, the range detectable by detection device 10 is the solid line portion indicated in the figure, and the broken line portion cannot be detected. Therefore, detection data D1 obtained by detection data obtainer 30 is only the three-dimensional data of the side of another vehicle 6s.

When the range detectable by detection device 10 is a part of the outer shape of object Oj as described above, the information that can be obtained by detection data obtainer 30 is the information of a part of the entire outer shape of object Oj, and the driving assistance information required for the driver cannot be generated using this information alone. Therefore, in the present embodiment, in addition to above detection data D1, three-dimensional data of an object and three-dimensional data of vehicle 4 stored in advance in storage 70 are used to generate the driving assistance information.

Storage 70 stores a plurality of pieces of three-dimensional data of objects. The three-dimensional data of the object is the three-dimensional data defined with respect to a predetermined origin and includes the data of the entire outer shape of the existing object. The three-dimensional data of the object may be data showing the outer shape of a standardized product or data showing the outer shape of a product disclosed in an external information network. The three-dimensional data of the object described above may be updated and added in a timely manner as a new product is made. The three-dimensional data of the object stored in storage 70 can be read from data complementation 41 of synthesizer 40.

Storage 70 stores vehicle data Dv that is three-dimensional data of vehicle 4. Vehicle data Dv is three-dimensional data defined with respect to a predetermined origin and includes the data of the entire outer shape of vehicle 4. Vehicle data Dv is stored in storage 70 when information processing device 20 is installed in vehicle 4 or when an optional item is added to vehicle 4. Vehicle data Dv stored in storage 70 can be read from data synthesizer 42 via vehicle data selector 71 to be described later.

Note that vehicle data Dv includes both the data of vehicle 4 in a state with its door closed and the data of vehicle 4 in a state with its door open. The door of vehicle 4 in this case may be side door 4s or rear door 4b.

Of vehicle data Dv, vehicle data selector 71 selects at least one of the data of vehicle 4 in the state with its door or the data of vehicle 4 in the state with its door open. For example, based on a selection switch input by a user, vehicle data selector 71 selects the data related to the open or closed state of the door. The selected data may be, for example, the data of a state with three side doors 4s closed and one side door 4s open, or the data of a state with four side doors 4s closed and one rear door 4b open. Based on preset information related to the opening and closing angles of each door, vehicle data selector 71 may select vehicle data Dv including information related to the opening and closing angles of each door. The data related to vehicle data Dv selected by vehicle data selector 71 is output to synthesizer 40.

Synthesizer 40 includes data complementation 41 and data synthesizer 42.

Data complementation 41 extracts object data Do, which is three-dimensional data of an object corresponding to detection data D1, from the plurality of pieces of three-dimensional data of the objects stored in storage 70. For example, data complementation 41 extracts data, having the highest correlation with detection data D1, as object data Do from the plurality of pieces of three-dimensional data of the objects. The degree of correlation may be determined by a correlation coefficient or a cosine similarity. Data complementation 41 may extract object data Do corresponding to detection data D1 by artificial intelligence (AI) analysis of the three-dimensional image.

Figure 7:
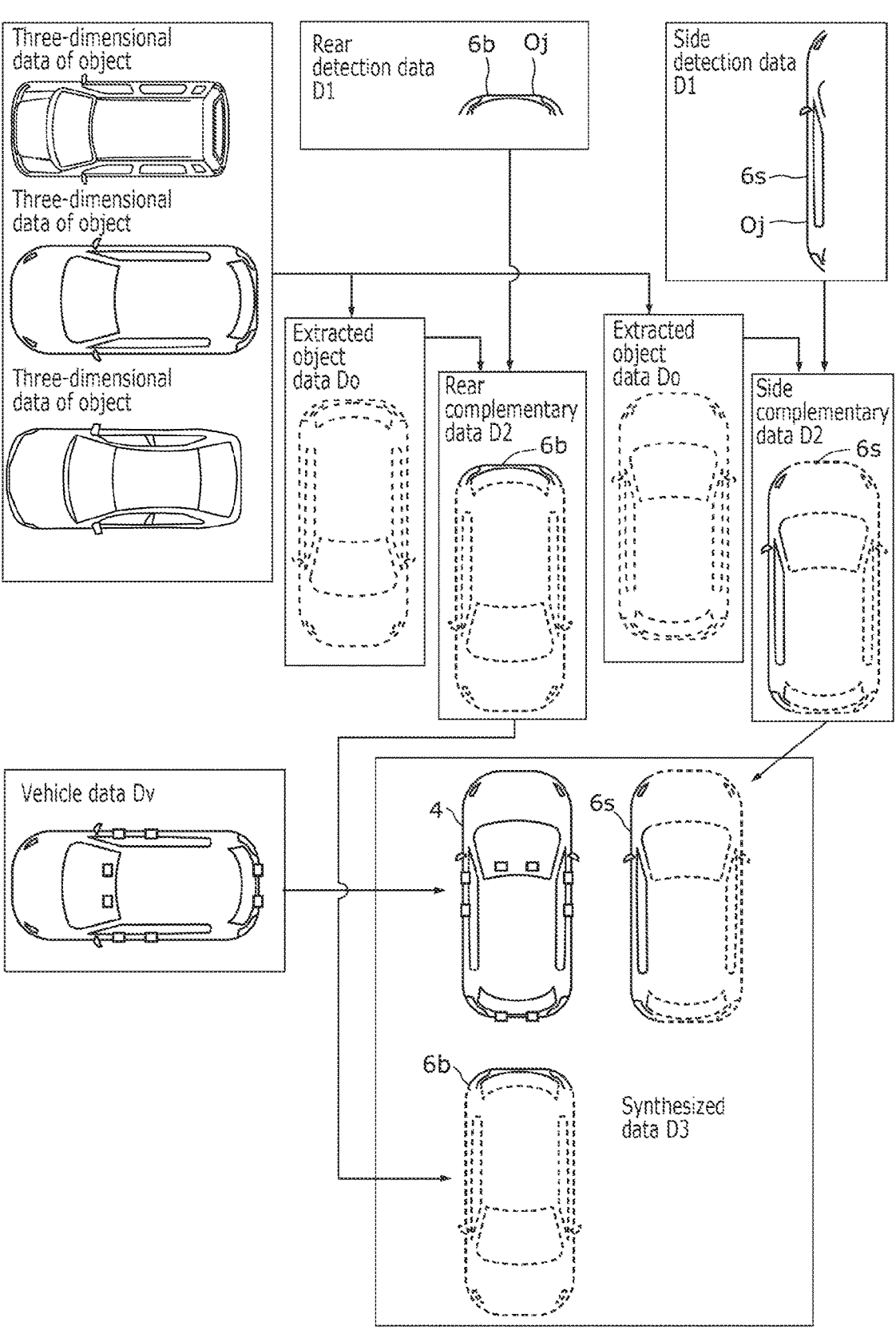
FIG. 7 schematically illustrates three-dimensional data processed by the information processing device.

FIG. 7 schematically illustrates three-dimensional data processed by information processing device 20. The figure illustrates the three-dimensional data in a planar form. In this example, an example will be described in which objects Oj located behind and on the right side of vehicle 4 are other vehicles 6b, 6s.

FIG. 7 illustrates rear detection data D1 and side detection data D1. FIG. 7 also illustrates the plurality of pieces of three-dimensional data of the objects, extracted object data Do, and vehicle data Dv. FIG. 7 also illustrates rear complementary data D2, side complementary data D2, and synthesized data D3.

Data complementation 41 extracts object data Do, which corresponds to detection data D1 of another vehicle 6b located behind vehicle 4, from the plurality of pieces of three-dimensional data of the objects. For example, data complementation 41 extracts object data Do, having a portion closest to rear detection data D1 of another vehicle 6b, from the plurality of pieces of three-dimensional data of the objects.

Then, data complementation 41 complements rear detection data D1 with extracted object data Do to generate complementary data D2 that is three-dimensional data of the rear. Rear complementary data D2 is generated by adding the data (broken line) of extracted object data Do, except for the portion overlapping with rear detection data D1, to detection data D1 (solid line).

Further, data complementation 41 extracts object data Do, which corresponds to detection data D1 of another vehicle 6*s* located at the side of vehicle 4, from the plurality of pieces of three-dimensional data of the objects. For example, data complementation 41 extracts object data Do, having a portion closest to side detection data D1 of another vehicle 6*s*, from the plurality of pieces of three-dimensional data of the objects.

Then, data complementation 41 complements side detection data D1 with extracted object data Do to generate complementary data D2 that is three-dimensional data of the side. Side complementary data D2 is generated by adding the data (broken line) of extracted object data Do, except for the portion overlapping with side detection data D1, to detection data D1 (solid line).

As described above, data complementation 41 extracts a plurality of pieces of object data Do corresponding to a plurality of pieces of detection data D1 from the pieces of three-dimensional data of the plurality of objects, and complements the plurality of pieces of detection data D1 with the plurality of pieces of object data Do to generate a plurality of pieces of complementary data D2. The plurality of pieces of complementary data D2 generated by data complementation 41 are output to data synthesizer 42.

Data synthesizer 42 synthesizes rear complementary data D2, side complementary data D2, and vehicle data Dv to generate synthesized data D3.

Note that information processing device 20 performs the same processes for the front and the left side. That is, data synthesizer 42 synthesizes vehicle data Dv and complementary data D2 for the rear, front, right side, and left side to generate synthesized data D3 including vehicle 4 and the surrounding area of vehicle 4. As described above, synthesizer 40 extracts object data Do corresponding to detection data D1 from the plurality of pieces of three-dimensional data of the objects, and synthesizes detection data D1, object data Do, and vehicle data Dv to generate synthesized data D3. Synthesized data D3 generated by data synthesizer 42 is output to image generator 80.

Based on synthesized data D3 output from data synthesizer 42, image generator 80 generates a predetermined image including vehicle 4 and the external area of vehicle 4. Image generator 80 generates, as the predetermined image, at least one of an image viewed from the side (see (a) in FIG. 2), an image viewed from above (see (b) in FIG. 2), or an image viewed obliquely (see (c) in FIG. 2), with respect to vehicle 4. Thus, image generator 80 generates an image with a changed viewing angle for vehicle 4, for example, a bird's eye view of vehicle 4 and its surroundings. The image generated by image generator 80 is not limited to a moving image but may be a frame-by-frame still image.

The predetermined image generated by image generator 80 is output to monitor controller 95. Note that the predetermined image output to monitor controller 95 is preset by an operation key on monitor 96.

Vehicle information obtainer 91 is communicatively connected to the electric control unit (ECU) of vehicle 4, and obtains vehicle information output from vehicle 4. The vehicle information is, for example, information related to whether parking has started, and includes the ignition information and shift lever information of vehicle 4. Vehicle information obtainer 91 obtains the vehicle information output from the ECU and outputs the vehicle information to operation switcher 92.

Based on the vehicle information output from vehicle information obtainer 91, operation switcher 92 switches the operations of information processing device 20 and monitor controller 95. For example, when the ignition is off, operation switcher 92 outputs signals to stop the operations of information processing device 20 and monitor controller 95 to information processing device 20 and monitor controller 95. When the ignition is on, operation switcher 92 outputs a signal to enable the operation of information processing device 20.

Operation switcher 92 switches the driving assistance information provided by information processing device 20 and monitor controller 95 according to the shift lever of vehicle 4, that is, whether vehicle 4 moves forward or backward. For example, when the ignition is on and the shift lever shows that it is in reverse, operation switcher 92 operates information processing device 20 to generate driving assistance information corresponding to reversing, and outputs an instruction signal to display an image corresponding to reversing to monitor controller 95.

Based on the command from operation switcher 92 and the output from image generator 80, monitor controller 95 generates an image to be displayed on monitor 96. Based on the command from monitor controller 95, monitor 96 provided in the cabin displays an image.

[Image Provided by Information Providing System]

Figure 8:
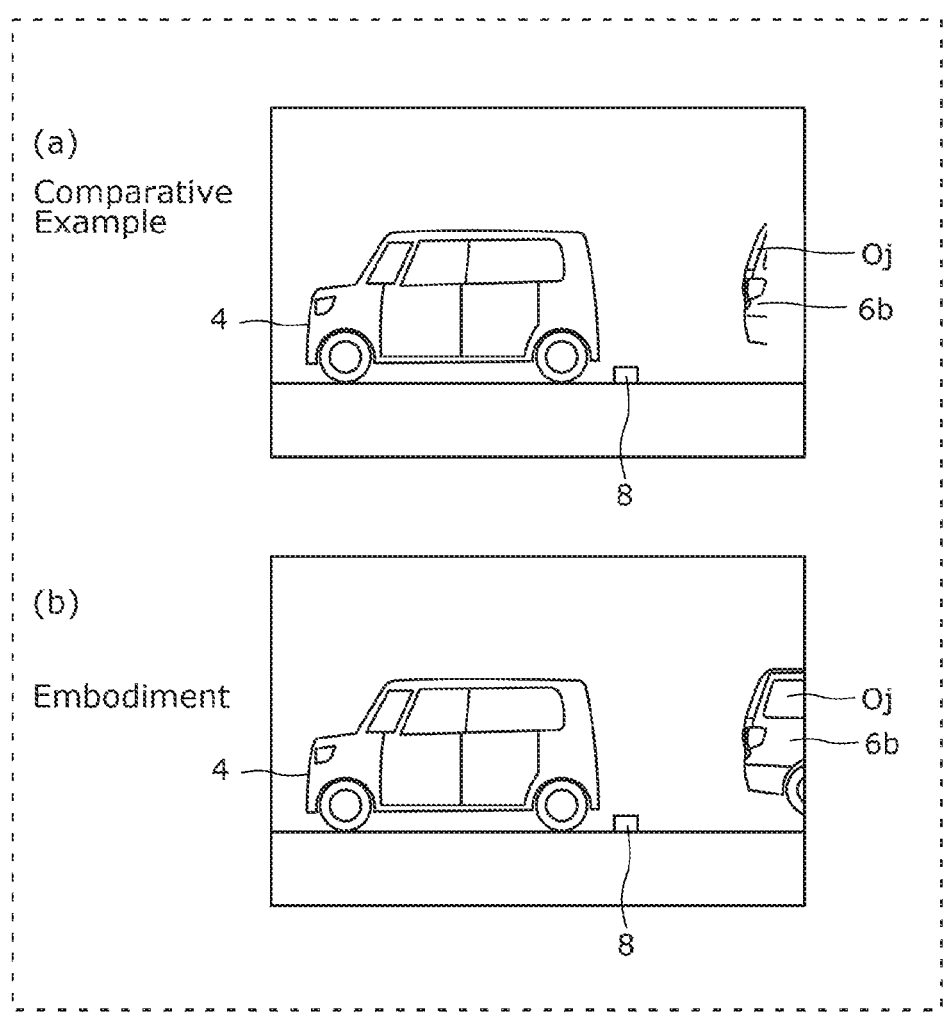
FIG. 8 illustrates an example of images provided by the information providing systems of the comparative example and the embodiment.

FIG. 8 illustrates an example of images provided by the information providing systems of the comparative example and the embodiment.

The figure illustrates images of vehicle 4 being parked facing rearward as viewed from the side. (a) in FIG. 8 is an image provided in the comparative example. However, this image represents only a part of the outer shape of another vehicle 6*b*, leading to the inability to sufficiently capture the state behind vehicle 4.

(b) in FIG. 8 is an image provided in the embodiment. This image is generated, for example, by changing the viewpoint with respect to three-dimensional synthesized data D3. The image illustrated in (b) in FIG. 8 is generated by viewing three-dimensional synthesized data D3 from the side. This image also represents the portion that could not be detected by detection device 10, making it possible to sufficiently capture the state behind vehicle 4.

Figure 9:
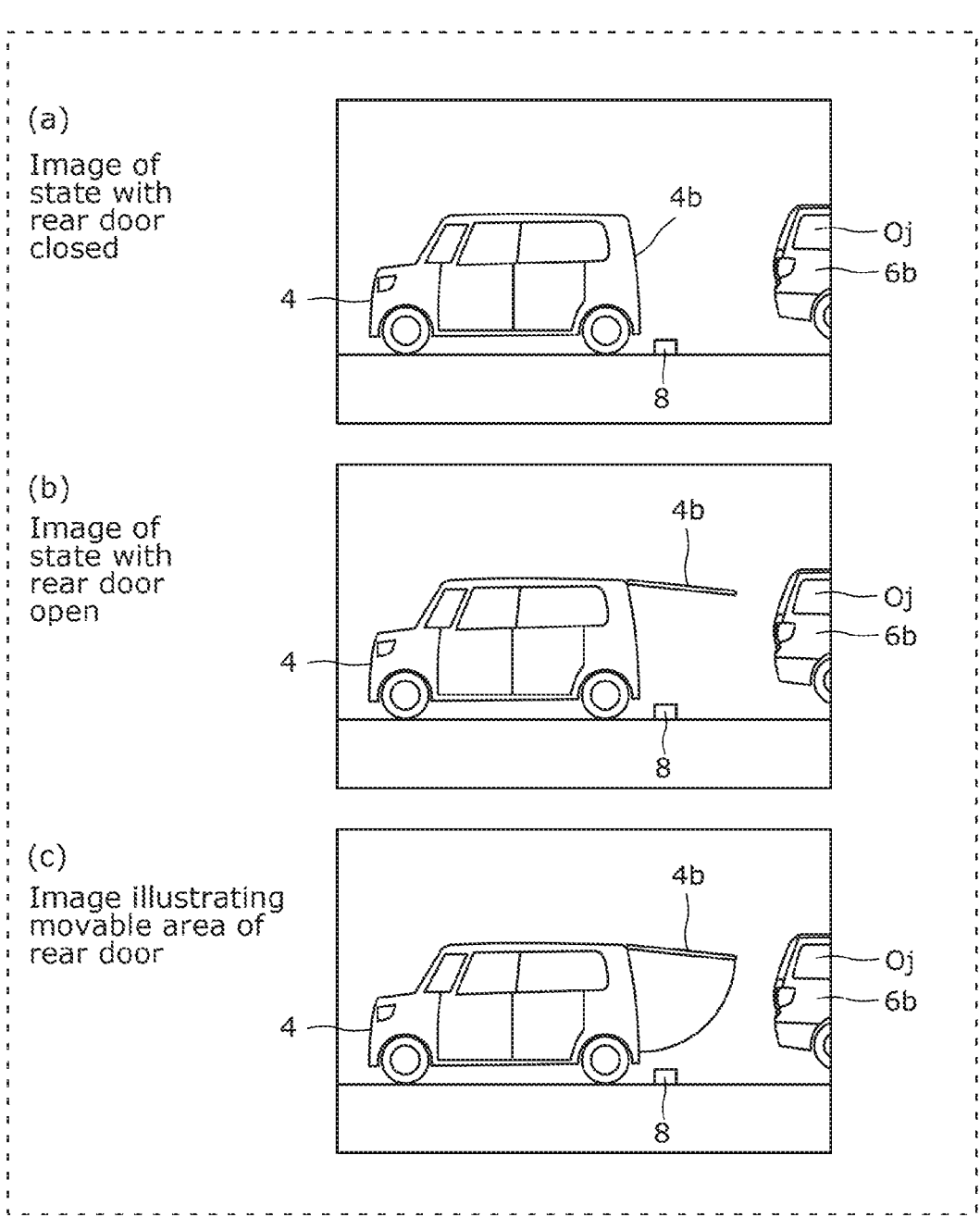
FIG. 9 illustrates another example of the images provided by the information providing system of the embodiment.

FIG. 9 illustrates another example of the images provided by information providing system 1.

(a) in FIG. 9 illustrates an image of a state with rear door 4*b* closed, (b) in FIG. 9 illustrates an image of a state with rear door 4*b* open, and (c) in FIG. 9 illustrates an image illustrating the movable area of rear door 4*b*. These images enable a preliminary check to determine whether vehicle 4 may collide with rear object Oj when rear door 4*b* is opened after parking. Note that the user can select in advance whether to display the opening and closing of rear door 4*b*.

Figure 10:
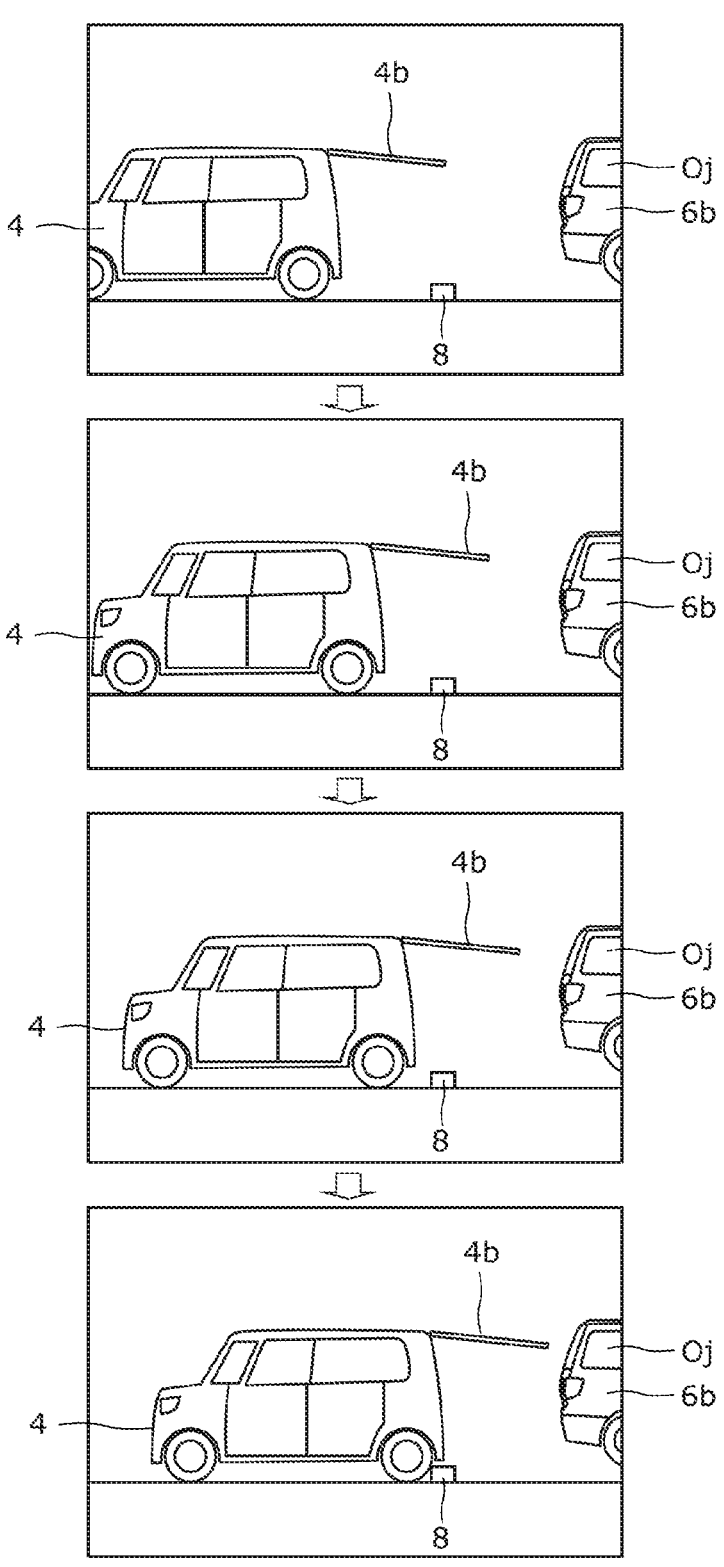
FIG. 10 illustrates another example of the images provided by the information providing system of the embodiment.

FIG. 10 illustrates another example of the images provided by information providing system 1.

The figure illustrates a plurality of images of vehicle 4 being parked facing rearward as viewed from the side. The images show a state where another vehicle 6*b* and vehicle stops 8, located behind vehicle 4, are stationary, and vehicle 4 moves relative to these objects. In addition, the figure virtually illustrates a state with rear door 4*b* open. These images enable the provision of vehicle 4 and object Oj, located behind vehicle 4, as information that can be viewed in an objective manner from outside vehicle 4.

Figure 11:
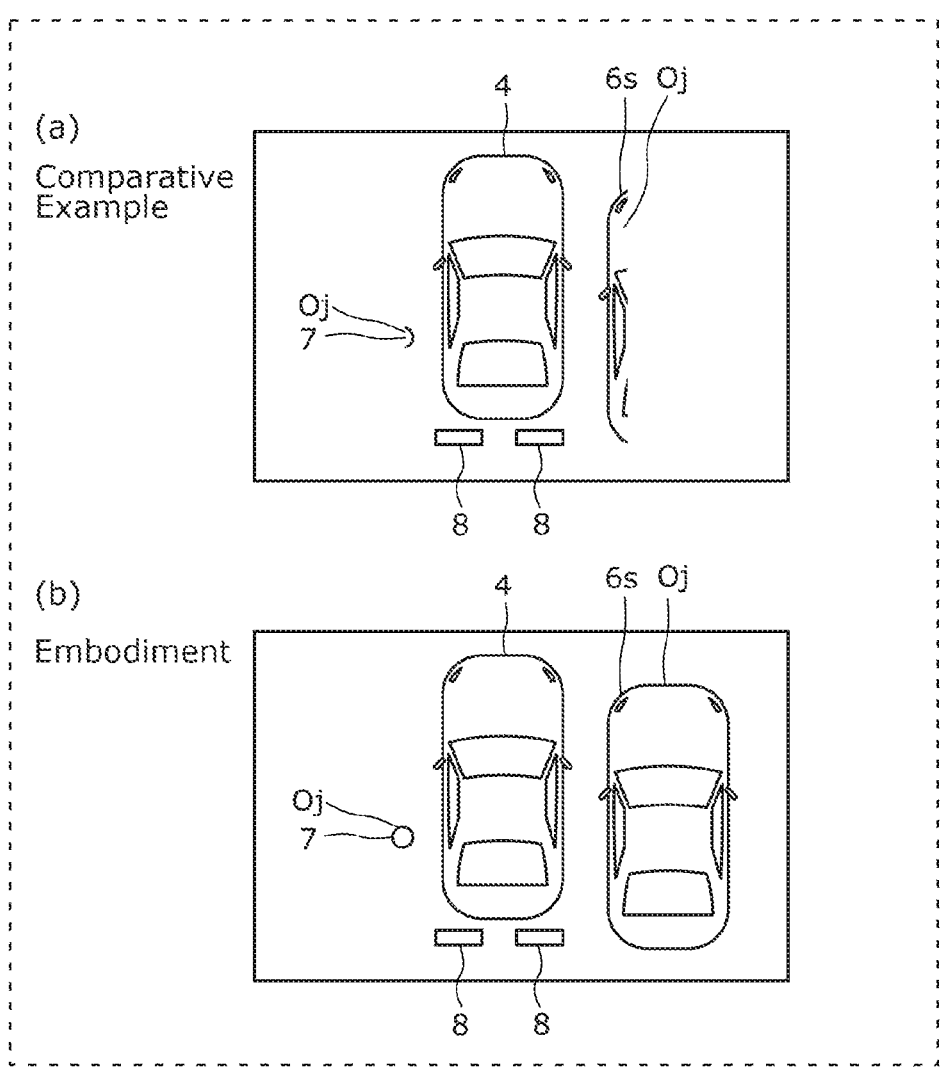
FIG. 11 illustrates another example of the images provided by the information providing systems of the comparative example and the embodiment.

FIG. 11 illustrates another example of the images provided by the information providing systems of the comparative example and the embodiment.

The figure illustrates images of vehicle 4 being parked facing rearward as viewed from above. (a) in FIG. 11 is an image provided in the comparative example. However, this image represents only a part of the outer shape of another vehicle 6s, leading to the inability to sufficiently capture the state at the side of vehicle 4.

(b) in FIG. 11 is an image provided in the embodiment. This image is generated, for example, by changing the viewpoint with respect to three-dimensional synthesized data D3. The image illustrated in (b) in FIG. 11 is generated by viewing three-dimensional synthesized data D3 from above. This image also represents the portion that could not be detected by detection device 10, making it possible to sufficiently capture the state at the side of vehicle 4

Figure 12:
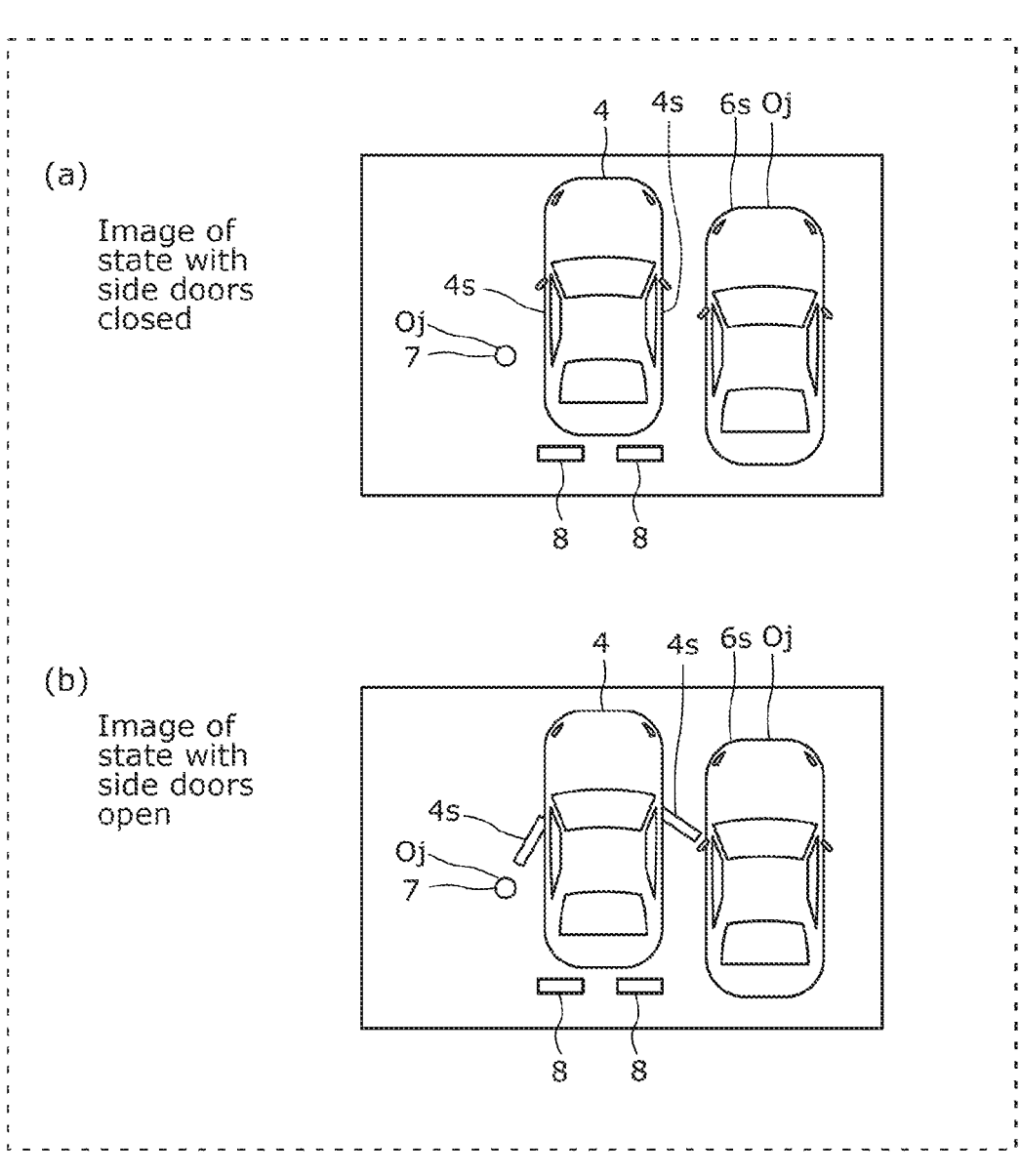
FIG. 12 illustrates another example of the images provided by the information providing system of the embodiment.

FIG. 12 illustrates another example of the images provided by information providing system 1.

(a) in FIG. 12 illustrates an image of a state with side doors 4s closed, and (b) in FIG. 12 illustrates an image of a state with two side doors 4s open. These images enable a preliminary check to determine whether vehicle 4 may collide with side object Oj when side door 4s is opened after parking. Note that the user can select in advance whether to display the opening and closing of side door 4s. Further, the user can preset the opening and closing angles of side door 4s.

Figure 13:
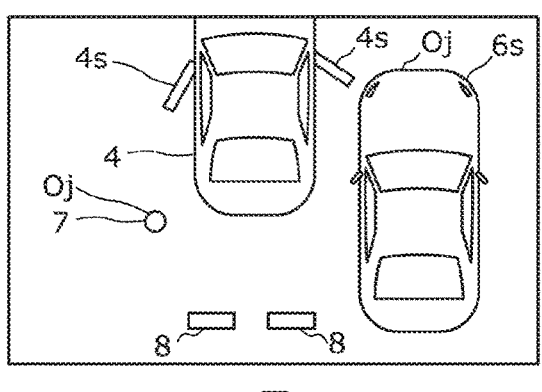
FIG. 13 illustrates another example of the images provided by the information providing system of the embodiment.
Figure 13:
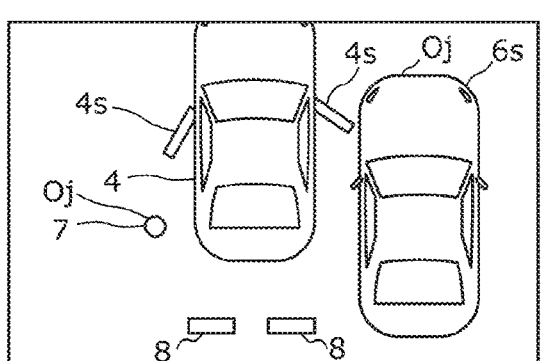
Figure 13:
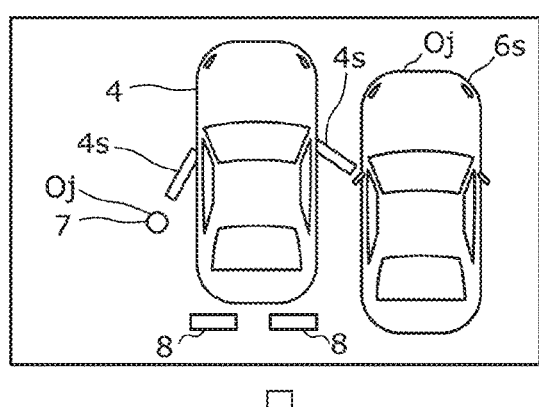
Figure 13:
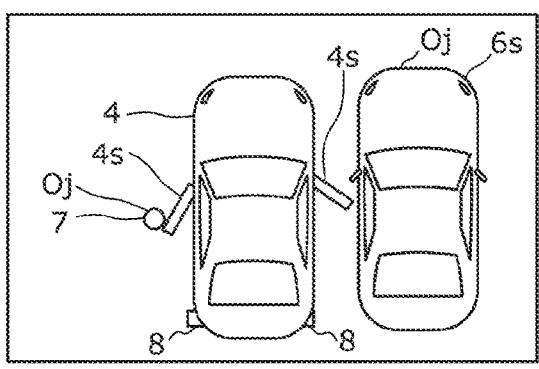

FIG. 13 illustrates another example of the images provided by information providing system 1.

The figure illustrates a plurality of images of vehicle 4 being parked facing rearward as viewed from above. The images show a state where another vehicle 6s and pole 7, located at the sides of vehicle 4, and vehicle stops 8, located behind vehicle 4, are stationary, and vehicle 4 moves relative to these objects. In addition, the figure virtually illustrates a state with side doors 4s open. These images enable the provision of vehicle 4 and objects Oj, located at the sides and behind vehicle 4, as information that can be viewed in a bird's eye view from outside vehicle 4.

[Information Processing Method]

An information processing method according to the embodiment will be described with reference to FIG. 14. The information processing method shown in this example is a method for generating driving assistance information for vehicle 4 when vehicle 4 is parked.

Figure 14:
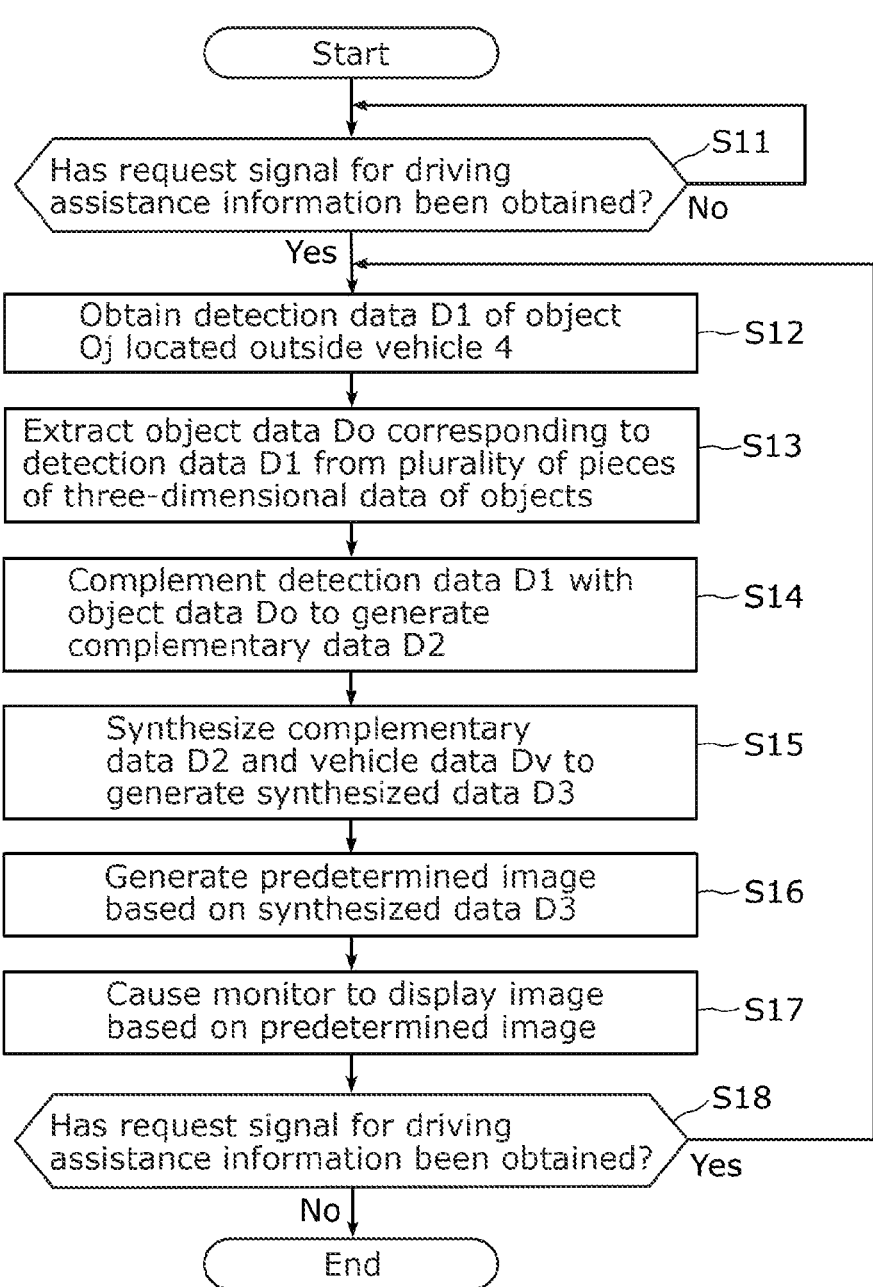
FIG. 14 is a flowchart illustrating an information processing method according to the embodiment.

FIG. 14 is a flowchart illustrating an information processing method according to the embodiment. Note that FIG. 14 illustrates processes executed by information providing system 1 as well as by information processing device 20.

First, information providing system 1 determines whether there is a request for driving assistance information (step S11). Specifically, it is checked whether vehicle information obtainer 91 has obtained a request signal for the driving assistance information from the ECU. When there is no request for the driving assistance information (No in S11), the process returns to step S11 and waits for a request for the driving assistance information. When there is a request for the driving assistance information (Yes in S11), information processing device 20 performs various processes for generating the driving assistance information.

Detection data obtainer 30 obtains detection data D1 that is three-dimensional data obtained by detecting object Oj located outside vehicle 4 (step S12). Detection data D1 is data obtained by detection device 10 installed in vehicle 4.

Note that detection data D1 is the three-dimensional data of a part of the outer shape of object Oj located outside vehicle 4. Detection data obtainer 30 obtains detection data D1 for each of the rear and side of vehicle 4.

Data complementation 41 extracts object data Do, which is three-dimensional data of an object corresponding to detection data D1, from the plurality of pieces of three-dimensional data of the objects stored in advance (step S13). The plurality of pieces of three-dimensional data of the objects is the data of each of objects stored in storage 70, and includes three-dimensional data of the entire outer shape of each of the objects. Data complementation 41 extracts data, having a high correlation with detection data D1, as object data Do from the plurality of pieces of three-dimensional data of the objects stored in storage 70. Data complementation 41 extracts object data Do corresponding to detection data D1 for each of the rear and side of vehicle 4.

Data complementation 41 complements detection data D1 with object data Do to generate complementary data D2 that is three-dimensional data (step S14). For example, data complementation 41 adds a portion of object data Do, except for the portion that overlaps detection data D1, to detection data D1 to generate complementary data D2. Data complementation 41 generates complementary data D2 for each of the rear and the side of vehicle 4.

Next, data synthesizer 42 synthesizes complementary data D2 and vehicle data Dv to generate synthesized data D3 that is three-dimensional data including vehicle 4 and the external area of vehicle 4 (step S15). For example, data synthesizer 42 synthesizes rear complementary data D2 of vehicle 4, side complementary data D2 of vehicle 4, and vehicle data Dv to generate synthesized data D3. Vehicle data Dv is the three-dimensional data of vehicle 4 stored in storage 70, and includes the data of the entire outer shape of vehicle 4. Note that data synthesizer 42 may read vehicle data Dv, which reflects data related to the opening and closing of the door, from storage 70.

Next, based on synthesized data D3, image generator 80 generates a predetermined image including vehicle 4 and the external area of vehicle 4 (step S16). The predetermined image is, for example, at least one of an image viewed from the side, an image viewed from above, or an image viewed obliquely, with respect to vehicle 4. Monitor controller 95 controls monitor 96 based on the predetermined image generated by image generator 80 and causes monitor 96 to display the image (step S17).

Next, information providing system 1 determines again whether there is a request for the driving assistance information (step S18). Specifically, it is determined whether vehicle information obtainer 91 continues to obtain a request signal for the driving assistance information from the ECU. When there is a request for the driving assistance information (Yes in S18), the process returns to step S12 to continue to provide the driving assistance information. When there is no request for the driving assistance information (No in S18), information processing device 20 terminates various processes for generating the driving assistance information. Executing the above steps S11 to S18 enables appropriate generation and provision of the driving assistance information for vehicle 4.

[Variation 1 of Embodiment]

Information processing device 20 of the present embodiment can be applied not only when vehicle 4 is parked, but also when vehicle 4 and another vehicle 6s pass each other on a narrow road. Information providing system 1 of Variation 1 provides driving assistance information by accepting a predetermined switch input when vehicle 4 is stopped or moving slowly, for example.

Figure 15:
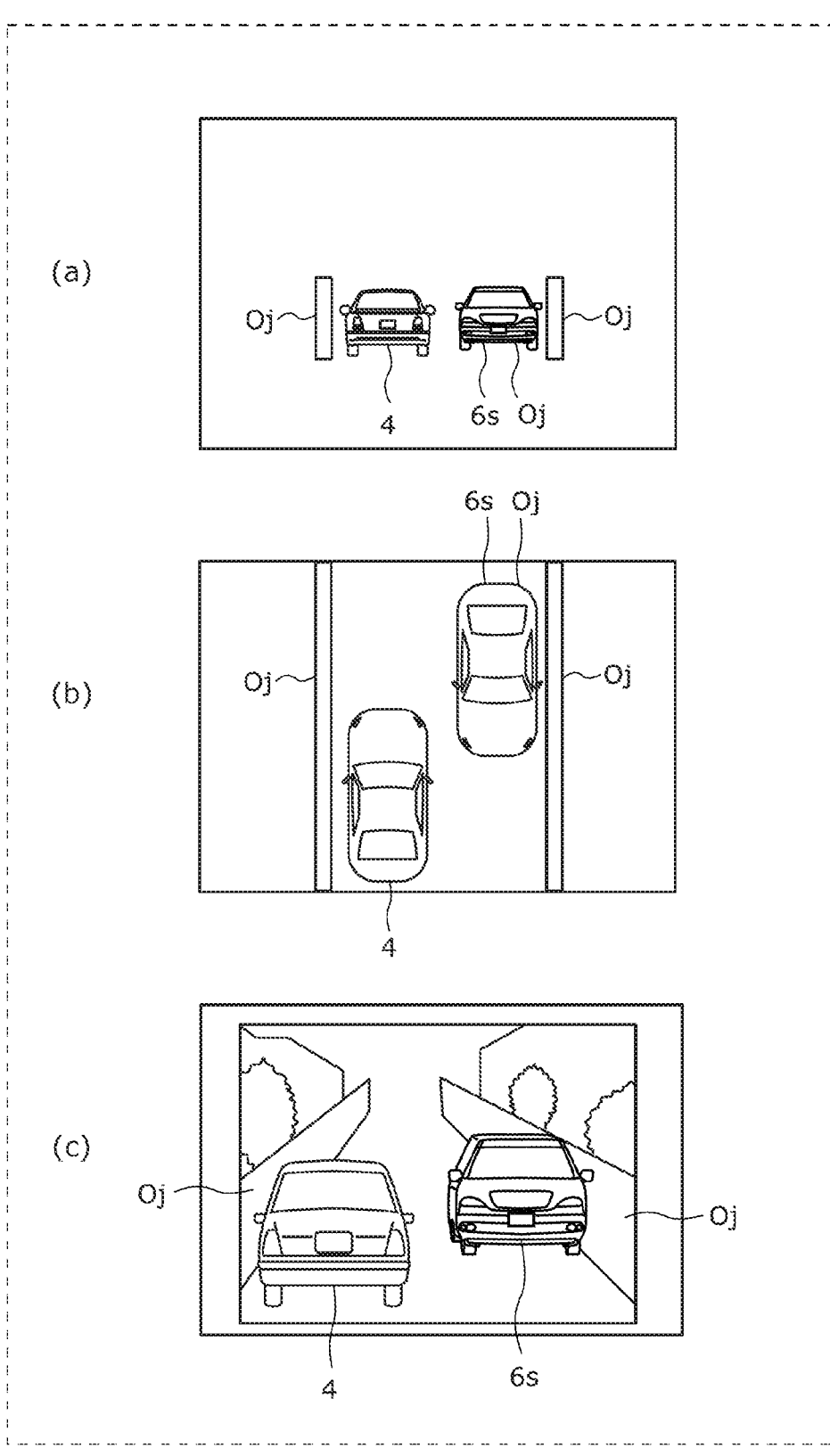
FIG. 15 illustrates images provided by an information providing system of Variation 1 of the embodiment.

FIG. 15 illustrates images provided by information providing system 1 of Variation 1 of the embodiment.

(a) in FIG. 15 illustrates a view of vehicle 4 and another vehicle 6s viewed from behind, (b) in FIG. 15 illustrates a view of vehicle 4 and another vehicle 6s viewed from above, and (c) in FIG. 15 illustrates a view of vehicle 4 and another vehicle 6s viewed obliquely from above. As illustrated in FIG. 15, vehicle 4 and object Oj located around vehicle 4 are provided as image information that can be viewed in a bird's eye view or an objective manner from outside vehicle 4, whereby it is possible to provide the driver with sufficient driving assistance information even when vehicle 4 runs on a narrow road.

[Variation 2 of Embodiment]

Information processing device 20 of the present embodiment is applicable not only to when vehicle 4 is parked, but also when vehicle 4 is stopped on the roadside. Information providing system 1 of Variation 2 provides driving assistance information by accepting a predetermined switch input when vehicle 4 is stopped or moving slowly, for example.

Figure 16:
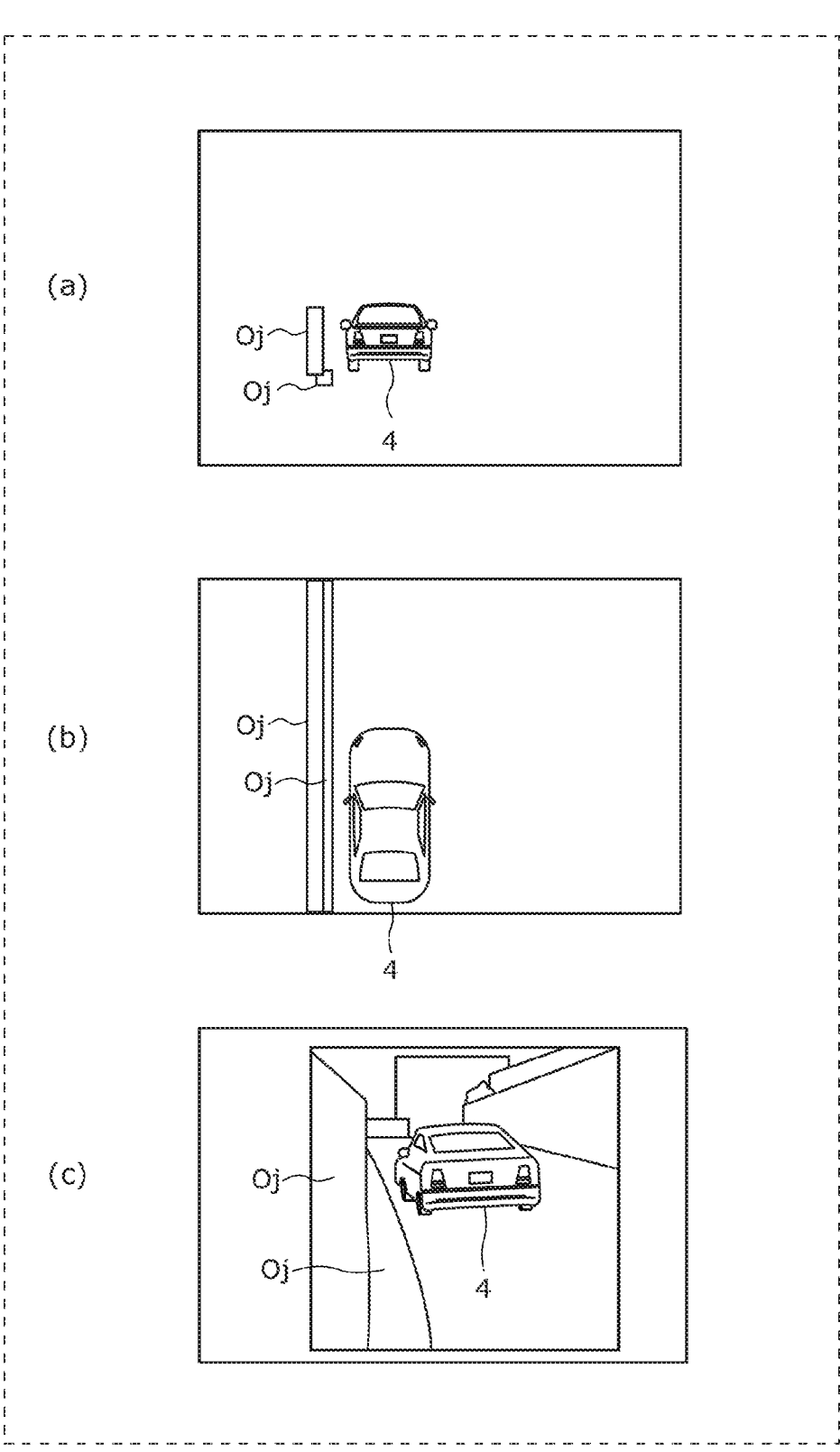
FIG. 16 illustrates images provided by an information providing system of Variation 2 of the embodiment.

FIG. 16 illustrates images provided by information providing system 1 of Variation 2 of the embodiment.

(a) in FIG. 16 illustrates a view of vehicle 4 as viewed from behind, (b) in FIG. 16 illustrates a view of vehicle 4 as viewed from above, and (c) in FIG. 16 illustrates a view of vehicle 4 as viewed obliquely from above. As illustrated in FIG. 16, vehicle 4 and object Oj located around vehicle 4 are provided as image information that can be viewed in a bird's eye view or an objective manner from outside vehicle 4, whereby it is possible to provide the driver with sufficient driving assistance information even when vehicle 4 is stopped on the roadside.

(Summary of Embodiment)

Information processing device 20 according to the present embodiment is an information processing device for generating driving assistance information for vehicle 4. Information processing device 20 includes: detection data obtainer 30 that obtains detection data D1, which is three-dimensional data obtained by detecting object Oj located outside vehicle 4; data complementation 41 that extracts object data Do, which is three-dimensional data of an object corresponding to detection data D1, from a plurality of pieces of three-dimensional data of objects stored in advance, and complements detection data D1 with object data Do to generate complementary data D2 that is three-dimensional data; and data synthesizer 42 that synthesizes complementary data D2 and vehicle data Dv, which is three-dimensional data of vehicle 4, to generate synthesized data D3 that is three-dimensional data including vehicle 4 and the external area of vehicle 4.

As described above, three-dimensional detection data D1 is complemented with three-dimensional object data Do to generate complementary data D2 that is three-dimensional data, and complementary data D2 and three-dimensional vehicle data Dv are synthesized to generate three-dimensional synthesized data D3. Accordingly, it is possible to generate the driving assistance information including the information of object Oj located outside vehicle 4.

Detection data D1 may be three-dimensional data of a part of the outer shape of object Oj located outside vehicle 4, and object data Do may include the three-dimensional data of the entire outer shape of the object stored in advance.

By object data Do including the data of the entire outer shape of the object as described above, three-dimensional complementary data D2 can be appropriately generated even when detection data D1 is data of a part of the outer shape of object Oj. Hence, complementary data D2 and three-dimensional vehicle data Dv can be synthesized to generate three-dimensional synthesized data D3, and generate the driving assistance information including the information of object Oj located outside vehicle 4.

Data complementation 41 may add a portion of object data Do, except for a portion that overlaps detection data D1, to detection data D1 to generate complementary data D2.

This makes it possible to generate complementary data D2 that is in line with reality, based on detection data D1 of actually detected object Oj. It is thereby possible to generate the driving assistance information including the information of object Oj located outside vehicle 4.

Information processing device 20 further includes storage 70 that stores the plurality of pieces of three-dimensional data of the objects. Data complementation 41 may extract data, having a high correlation with detection data D1, as object data Do from the plurality of pieces of three-dimensional data of the objects stored in storage 70.

By extracting data, having a high correlation with detection data D1, as object data Do as described above, it is possible to enhance the extraction accuracy of object data Do. Hence it is possible to appropriately generate complementary data D2 and generate the driving assistance information including the information of object Oj located outside vehicle 4.

Information processing device 20 may further include storage 70 in which vehicle data Dv is stored, and data synthesizer 42 may generate synthesized data D3 based on vehicle data Dv stored in storage 70.

This makes it possible to generate the driving assistance information including the information of vehicle 4 and object Oj located outside vehicle 4. It is thereby possible to provide information that can be viewed in a bird's eye view or an objective manner from outside vehicle 4.

Information processing device 20 may generate the driving assistance information when vehicle 4 is parked.

This enables the generation of the driving assistance information including the information of object Oj located outside vehicle 4 when vehicle 4 is parked.

Detection data obtainer 30 may obtain a plurality of pieces of detection data D1 that are pieces of detection data of objects Oj located at least behind and at the side of vehicle 4. Data complementation 41 may extract a plurality of pieces of object data Do based on the plurality of pieces of detection data D1, and complement the plurality of pieces of detection data D1 with the plurality of pieces of object data Do to generate a plurality of pieces of complementary data D2. Data synthesizer 42 may generate synthesized data D3 based on the plurality of pieces of complementary data D2 and vehicle data Dv.

As described above, synthesized data D3 is generated using detection data D1, object data Do, and complementary data D2 for the rear and the side, whereby it is possible to generate the driving assistance information including the information of vehicle 4 and object Oj located around vehicle 4. It is thereby possible to provide information that can be viewed in a bird's eye view or an objective manner from outside vehicle 4.

Information processing device 20 further includes image generator 80 for generating a predetermined image, which includes vehicle 4 and the external area of vehicle 4, based on synthesized data D3 generated by data synthesizer 42. Image generator 80 may generate, as a predetermined image, at least one of an image viewed from the side, an image viewed from above, or an image viewed obliquely, with respect to vehicle 4.

It is thereby possible to provide information that can be viewed in a bird's eye view or an objective manner from outside vehicle 4.

Vehicle data Dv may include at least one of the data of vehicle 4 in the state with its door or the data of vehicle 4 in a state with its door open.

This enables the generation and provision of the driving assistance information including the information related to the opening and closing of the door of vehicle 4.

Information processing device 20 according to the present embodiment is an information processing device for generating driving assistance information for vehicle 4. Information processing device 20 includes: detection data obtainer 30 that obtains detection data D1, which is three-dimensional data obtained by detecting object Oj located outside vehicle 4; and a synthesizer 40 that extracts object data Do, which is three-dimensional data of an object corresponding to detection data D1, from the plurality of pieces of three-dimensional data of the objects stored in advance, and synthesizes detection data D1, object data Do, and the three-dimensional data (vehicle data Dv) of vehicle 4 to generate synthesized data D3 that is three-dimensional data.

As described above, three-dimensional detection data D1, three-dimensional object data Do, and three-dimensional vehicle data Dv are synthesized to generate three-dimensional synthesized data D3, whereby it is possible to generate the driving assistance information including the information of object Oj located outside vehicle 4.

The information processing method according to the present embodiment is an information processing method for generating driving assistance information for vehicle 4. The information processing method includes: obtaining detection Data D1 that is three-dimensional data obtained by detecting object Oj located outside vehicle 4; extracting object data Do, which is three-dimensional data of the object corresponding to detection data D1, from three-dimensional data of a plurality of objects stored in advance; complementing detection data D1 with object data Do to generate complementary data D2 that is three-dimensional data; and synthesizing complementary data D2 and vehicle data Dv, which is three-dimensional data of vehicle 4, to generate synthesized data D3 that is three-dimensional data including vehicle 4 and the external area of vehicle 4.

As described above, three-dimensional detection data D1 is complemented with three-dimensional object data Do to generate complementary data D2 that is three-dimensional data, and complementary data D2 and three-dimensional vehicle data Dv are synthesized to generate three-dimensional synthesized data D3.

Accordingly, it is possible to generate the driving assistance information including the information of object Oj located outside vehicle 4.

The program according to the present embodiment is a non-transitory computer-readable recording medium having recorded thereon the above information processing method for causing a computer to execute.

This makes it possible to cause a computer to execute the information processing method according to the recording medium.

Note that these general or specific aspects may be realized in a system, method, integrated circuit, computer program, or non-transitory recording medium such as a computer-readable compact disc read-only memory (CD-ROM) or may be realized in any combination of a system, method, integrated circuit, computer program, or recording medium. The program may be stored in advance on the recording medium, or may be supplied to the recording media via a wide area network including the Internet.

Other Embodiments

The embodiment and the like have been described above. However, the above embodiment and the like are essentially preferred examples and are not intended to limit the scope of the present invention, the scope of its application, or the scope of its use.

In the above embodiment, the example in which detection device 10 outputs detection data D1 to detection data obtainer 30 has been shown, but the present invention is not limited thereto. For example, when raw data detected by detection device 10 is output to detection data obtainer 30, detection data obtainer 30 may generate detection data D1, which includes three-dimensional distance information, based on the raw data, thus obtaining detection data D1.

In the above embodiment, the example in which data complementation 41 extracts predetermined object data Do from the plurality of pieces of three-dimensional data of the objects stored in storage 70 has been shown, but the present invention is not limited thereto. For example, when vehicle 4 includes a wireless module, data complementation 41 may access an external server via the wireless module and extract predetermined object data Do from the plurality of pieces of three-dimensional data of the objects stored in advance in the server.

In the above embodiment, the case where vehicle 4 is parked facing rearward has been described, but the present invention is not limited thereto. For example, information providing system 1 can generate the driving assistance information for vehicle 4 and provide the information to the driver even when vehicle 4 is parked facing forward or parallel parked.

In the above embodiment, the example in which one image is displayed on monitor 96 has been described, but the present invention is not limited thereto. For example, when monitor 96 is divided and displayed, three images of (a), (b), and (c) in FIG. 2 may be simultaneously displayed on monitor 96. In addition to (a) to (c) in FIG. 2, the image illustrated in (a) in FIG. 1 may also be displayed simultaneously.

The present disclosure has been described based on the embodiments and variations of embodiments, but the present disclosure is not limited to these embodiments and variations of the embodiments.

The information processing device according to each of the above embodiments and variations of the embodiments may be implemented by a program using a computer, and such a program may be stored in a storage device.

The processing units included in the information processing device according to each of the above embodiments and variations of the embodiments are realized as large-scale integrated circuits (LSIs), which are typically integrated circuits. These may be individually integrated into one chip, or integrated into one chip to include some or all of them.

The integrated circuit is not limited to the LSI, but may be realized by a dedicated circuit or a general-purpose processor. A field programmable gate array (FPGA), which can be programmed after LSI manufacturing, or a reconfigurable processor, which can reconfigure the connections and settings of circuit cells inside the LSI, may be used.

In the above embodiments and variations of the embodiments, each component may be configured by dedicated hardware or may be implemented by executing a software program suitable for each component. Each of the components may be implemented by a program execution unit, such as a central processing unit (CPU) or a processor, reading and executing a software program recorded on a recording medium, such as a hard disk or a semiconductor memory.

In addition, all of the numbers used above are shown as examples to specifically describe the present disclosure, and the embodiments and variations of the embodiments of the present disclosure are not limited to the numbers shown as the examples.

The division of the functional blocks in the block diagram is an example, and a plurality of functional blocks may be realized as one functional block, one functional block may be divided into a plurality of functional blocks, or some of the functions may be transferred to other functional blocks. The functions of a plurality of function blocks having similar functions may be processed in parallel or in a time-division manner by a single piece of hardware or software.

The order in which the steps in the flowchart are shown as an example to specifically describe the present disclosure, and may be any order other than the above. Some of the above steps may be performed simultaneously (in parallel) with other steps.

The present disclosure also includes embodiments that can be obtained by applying various modifications, which a person skilled in the art can conceive, to the embodiments and variations of the embodiments, and embodiments that can be realized by any combination of the components and functions of the embodiments and variations of the embodiments without departing from the gist of the present disclosure.

While various embodiments have been described herein above, it is to be appreciated that various changes in form and detail may be made without departing from the spirit and scope of the present disclosure as presently or hereafter claimed.

Further Information About Technical Background to This Application

The disclosure of the following patent application including specification, drawings, and claims are incorporated herein by reference in their entirety: Japanese Patent Application No. 2023-010215 filed on Jan. 26, 2023.

INDUSTRIAL APPLICABILITY

The present disclosure can be widely used in automotive technology and other fields as an information processing device for generating vehicle driving assistance information.

The invention claimed is:

1. An information processor for generating driving assistance information for a vehicle, the information processor comprising:
a detection data obtainer circuit that obtains detection data, the detection data being three-dimensional data obtained by detecting an object located outside the vehicle;
a data complementation circuit that extracts object data from a plurality of pieces of three-dimensional data of objects stored in advance, the object data being three-dimensional data of the object corresponding to the detection data, and complements the detection data with the object data to generate complementary data that is three-dimensional data; and
a data synthesizing circuit that
accepts, from a user, an input for selecting a specific door among a plurality of doors provided on the vehicle and an input for selecting a door opening and closing angle state of the specific door, and
synthesizes the complementary data and vehicle data, the vehicle data being three-dimensional data of the vehicle related to an open or closed state of the specific door selected by the user and the door opening and closing angle state of the specific door selected by the user, to generate synthesized data that is three-dimensional data including the vehicle and an external area of the vehicle.

2. The information processor according to claim 1, wherein the detection data is three-dimensional data of a part of an outer shape of the object located outside the vehicle, and
the object data includes three-dimensional data of an entirety of the outer shape of the object, the three-dimensional data of the object data being stored in advance.

3. The information processor according to claim 1, wherein the data complementation circuit adds a portion of the object data, the portion excluding a portion overlapping with the detection data, to the detection data to generate the complementary data.

4. The information processor according to claim 1, further comprising:
a storage that stores the plurality of pieces of three-dimensional data of the objects,
wherein the data complementation circuit extracts, from the plurality of pieces of three-dimensional data of the objects stored in the storage, data having a high correlation with the detection data as the object data.

5. The information processor according to claim 1, further comprising:
a storage that stores the vehicle data,
wherein the data synthesizing circuit generates the synthesized data based on the vehicle data stored in the storage.

6. The information processor according to claim 1, wherein the information processor generates the driving assistance information when the vehicle is parked.

7. The information processor according to claim 1, wherein the detection data obtainer circuit obtains a plurality of pieces of the detection data that are pieces of detection data of objects located at least behind and at a side of the vehicle,
the data complementation circuit extracts a plurality of pieces of the object data based on the plurality of pieces of the detection data, and complements the plurality of pieces of the detection data with the plurality of pieces of the object data to generate a plurality of pieces of the complementary data, and
the data synthesizing circuit generates the synthesized data based on the plurality of pieces of the complementary data and the vehicle data.

8. The information processor according to claim 1, further comprising:
an image generator circuit that generates a predetermined image including the vehicle and the external area of the vehicle, based on the synthesized data generated by the data synthesizing circuit,
wherein the image generator circuit generates, as the predetermined image, at least one of an image viewed from a side, an image viewed from above, or an image viewed obliquely, with respect to the vehicle.

9. An information processor for generating driving assistance information for a vehicle, the information processor comprising:

a detection data obtainer circuit that obtains detection data, the detection data being three-dimensional data obtained by detecting an object located outside the vehicle; and a synthesizing circuit that extracts object data from a plurality of pieces of three-dimensional data of objects stored in advance, the object data being three-dimensional data of the object corresponding to the detection data, accepts, from a user, an input for selecting a specific door among a plurality of doors provided on the vehicle and an input for selecting a door opening and closing angle state of the specific door, and synthesizes the detection data, the object data, and three-dimensional data of the vehicle related to an open or closed state of the specific door selected by the user and the door opening and closing angle state of the specific door selected by the user to generate synthesized data that is three-dimensional data.

10. An information processing method for generating driving assistance information for a vehicle, the information processing method comprising:

obtaining detection data, the detection data being three-dimensional data obtained by detecting an object located outside the vehicle;

extracting object data from a plurality of pieces of three-dimensional data of objects stored in advance, the object data being three-dimensional data of the object corresponding to the detection data, and complements the detection data with the object data to generate complementary data that is three-dimensional data;

accepting, from a user, an input for selecting a specific door among a plurality of doors provided on the vehicle and an input for selecting a door opening and closing angle state of the specific door, and synthesizing the complementary data and vehicle data, the vehicle data being three-dimensional data of the vehicle related to an open or closed state of the specific door selected by the user and the door opening and closing angle state of the specific door selected by the user, to generate synthesized data that is three-dimensional data including the vehicle and an external area of the vehicle.

11. A non-transitory computer-readable recording medium having recorded thereon a computer program for causing a computer to execute the information processing method according to claim 10.

* * * * *